Nov. 14, 1944.    S. M. MacNEILLE    2,362,573
PROJECTION SCREEN
Filed June 3, 1942
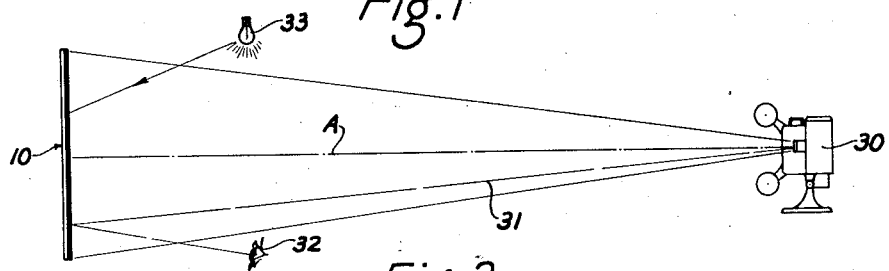
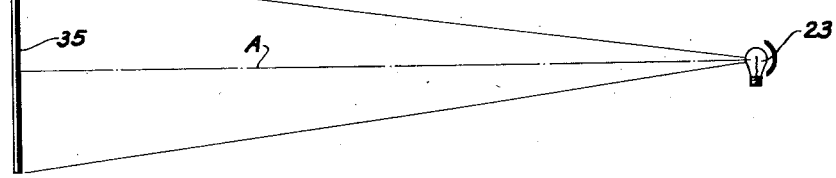
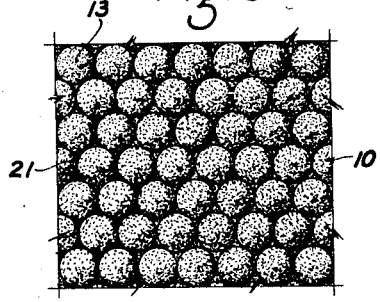
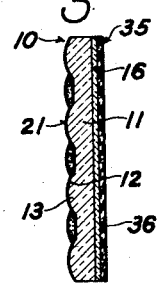
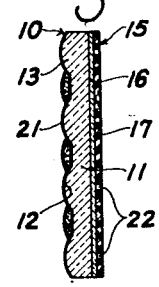
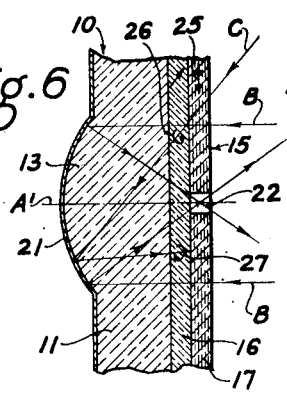
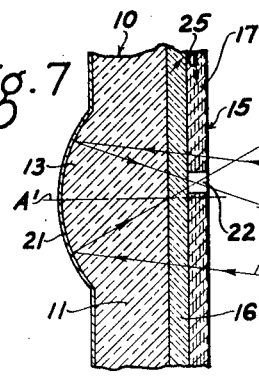
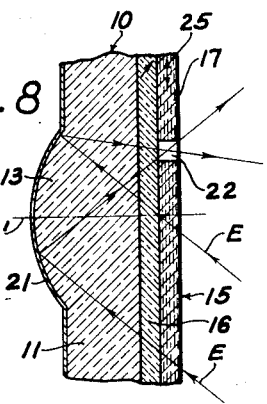
Stephen M. MacNeille
INVENTOR
BY
ATTORNEYS Patented Nov. 14, 1944

2,362,573

UNITED STATES PATENT OFFICE 2,362,573

PROJECTION SCREEN

Stephen M. MacNeille, Rochester, N. Y., assignor to Eastman Kodak Company, Rochester, N. Y., a corporation of New Jersey Application June 3, 1942, Serial No. 445,579

15 Claims. (Cl. 88—28.90)

The present invention relates to projection screens and more particularly to the type known as reflection or front projection screens.

With front projection screens, the projector and the audience are on the same side of the diffusing screen. For best results, the screen should reflect back substantially all the light which falls on it with equal intensity to all viewing points, i. e. diffusely with a minimum amount of specular reflection. However, heretofore such screens have also uniformly diffused all extraneous light falling on them and hence have not been satisfactory when used where it is impossible to completely darken the room in which the screen is located. In other words, the best results are obtained when the screen is used where no extraneous light aside from the projected light reaches the screen.

Sometimes, when an image was projected onto a screen in daylight, a rear projection screen was used which had a black appearance and in which the projector was located behind the screen and the audience in front of the screen but this is not always convenient. The present invention provides a front projection screen which can be used under daylight or darkened conditions and when used in daylight will appear black to all light coming from sources other than from the projector. Thus, annoying foreign reflections and lowering of picture contrast due to overall haze are minimized or eliminated.

The primary object of the invention is to provide a front view projection screen which except for the desired image appears dark or black to the observer.

Another object of the invention is to provide a front view projection screen which can be used in the dark or in the light and will give effectively uniform intensity from all ordinary viewing angles.

A further object of the invention is to provide a front view projection screen which will receive all the light incident upon it but will return only light coming from the projector.

Further objects and advantages will be apparent to those skilled in the art by the description which follows.

The above and other objects are provided by a projection screen in which a light transmitting support is preferably included and has lenticular elements formed in one surface thereof with a layer of reflecting material covering the lenticulated surface. In this preferred embodiment, a quarter-wave retardation layer and a plane polarizing material with non-polarizing spots at the foci of the lenticular elements are placed adjacent the other surface of the support, which faces the projector and the audience, to intercept all the light incident on the screen but allowing only the light from the projector to be returned through the non-circularly polarizing spots to the audience. The term foci is here used to refer to the points conjugate to the source of light with respect to the lenticular elements as will appear from the following detailed description.

The use of lenticular elements in projection screens is well known in the art, and the properties of polarizing materials are also well known, but in the combination of a lenticular reflecting surface and a circular polarizer a projection screen is obtained which is of the reflecting type. The combination also provides a reflection screen that can be used for daylight projection since it gives a darkened or black appearance to the observer except for the small exit pupils and does not reflect the extraneous light incident upon the screen.

Reference is hereby made to the accompanying drawing in which like reference numerals and characters designate similar parts and wherein:

Fig. 1 is a diagrammatic view showing the relation of the projector to the screen;

Fig. 2 is a diagrammatic view showing a preferred method of depolarizing portions of the plane polarizer to provide exit pupils or slots for the reflected light;

Fig. 3 is an enlarged rear view of a portion of the screen;

Fig. 4 is a partial sectional view taken on the line 4—4 of Fig. 3 showing the relation of the various elements comprising the screen before processing;

Fig. 5 is a view similar to Fig. 4 showing the final screen having non-polarizing spots in the circular polarizer;

Fig. 6 is an enlarged section through one of the lenticular elements near the center of the screen showing the reflection of the light from the projector through the non-polarizing spot and the cutting off of the extraneous light;

Fig. 7 is an enlarged section through one of the lenticular elements beyond the center of the screen showing the displacement of the non-polarizing spot with respect to the optic axis of the element;

Fig. 8 is an enlarged section through one of the lenticular elements near the edge of the screen showing the displacement of the noncircularly-polarizing spot with respect to the optic axis of the element; and Fig. 9 is a partial front elevation showing a row of the non circularly-polarizing spots and their progressively displaced position with respect to the optic axis of the lenticular elements.

In Fig. 1, a screen 10 according to the invention receives an image projected thereonto from the front by a projector 30 which may be either a still or motion picture projector. Light from the projector 30, as indicated by the ray 31 is dispersed by the screen 10 and some of it reaches the eye 32 of an observer thus displaying the image. However, light from any extraneous source 33 is practically entirely absorbed by the screen which thus eliminates unwanted reflections.

Although a screen to do this may be made by several methods, each of the preferred ones involve the step of exposing a special photosensitive 35 as illustrated in Fig. 2. It will be noted that a light source 23 is arranged so as to occupy with respect to the sensitive material 35, the same position as the projector 30 occupies with respect to the finished screen 10. As explained in detail below, this results in a screen which will reflect and disperse light only from a point corresponding to that occupied by the source 23 during the exposing. The operation of the screen will be described before the details are given for the methods of making it.

As shown in Figs. 3, 4 and 5 the sensitive material 35 and screen 10 made therefrom, preferably include a reflecting surface 21 made up of a plurality of elements each of which is a concave mirror concave to the front. For convenience in manufacture and use, this reflecting surface is mounted on one side of a transparent support 11 and is preferably made by coating a metallic layer onto a transparent sheet having lenticules embossed thereon. At the focal plane of these concave mirrors, or at least near said focal plane a photosensitive layer 36 is positioned which after processing becomes a circular polarizing sheet facing away from the surface 21 except in areas which have been highly exposed and are processed to be non-polarizing (circularly) as described above. Again for convenience, this sensitive layer 36 is mounted on the front surface of the transparent support 11 whose thickness should therefore be approximately equal to the focal distance of the concave mirrors, conjugate to the distance of the light source, which focal distance for practical purpose is approximately equal to the focal length of the mirrors which in turn is one half their radius of curvature.

Thus as shown best in Fig. 5, a preferred form of the screen 10 comprises a light transmitting support 11, the rear surface 12 of which has formed therein a plurality of lenticules. The front surface of the support 11 carries a circular polarizer 15 which consists of a quarter-wave retardation layer 16 and a plane polarizing layer 17 with its vibration axis oriented at 45 degrees to the optic axis of the quarter wave retardation layer 16. Atttention is drawn, at this point, to the difference between a quarter-wave retardation layer which is well known to those skilled in the study of polarized light and an optical interference layer which, if it is a single layer, is generally just one-quarter wave length thick. A quarter-wave retardation layer is usually much thicker; i. e., of sufficient thickness for the ordinary and extraordinary rays passing therethrough to gain a difference in phase of one-quarter wave length. In the present embodiment, the quarter-wave retardation layer is a sheet of birefringent material, such as that now commercially known as Cellophane, of the proper thickness and orientation.

When the screen 10 is illuminated, as shown in Fig. 1, the lenticular elements 13, in the paraxial region of the screen 1. e., immediately surrounding the optic axis A, will receive the light from the projector 30 which will be reflected by the layer 21, which may be a coating of aluminum or silver, back to the observer in front of the screen. This light, designated by B in Fig. 6, on passing through the plane polarizing layer 17 and the quarter-wave retardation layer 16 becomes circularly polarized and is then reflected and focused by the layer 21 on the plane polarizer 17. The reflected light in passing through the quarter-wave retardation layer is reverted to plane polarized light which is viewed by the observer. In order to allow the reflected light to return as plane polarized light, areas or spots 22 are provided in the plane polarizer 17, at the focus of each lenticular element, which spots are non circularly-polarizing.

The extraneous light, designated by C in Fig. 6, on passing through the plane polarizer 17 is plane polarized as shown by the double-headed arrow 25 and after passing through the quarter-wave retardation layer 16 is circularly polarized as shown by the circle 26. After reflection at the surface 12, at least part of the light is still circularly polarized but is rotating in the opposite direction when it strikes the quarter-wave retardation layer 16, and in passing through this layer it again becomes plane polarized as indicated by the arrow 27. Since the plane of polarization is crossed with respect to the plane polarizer 17, this reflected extraneous light cannot reach the eye of the observer.

The lenticular elements beyond the paraxial region of the screen will not receive the light parallel to the optic axis but will receive the light at an increasing angle toward the edge of the screen. This light, designated by D in Fig. 7 and E in Fig. 8, is returned to the eye of the observer through the non circularly-polarizing spot 22, as described above with reference to Fig. 6, but it will be noted that the non circularly-polarizing spot is progressively displaced, as shown in Fig. 9, toward the edge of the screen with respect to the optic axis A'. This displacement of the non circularly-polarizing spot 22 is obtained automatically by the exposing step illustrated in Fig. 2 which eliminates the difficulties of proper registry in other methods of obtaining the depolarized or non polarized spots.

In all cases, whether the extraneous light falls upon the screen near the paraxial region or near the edge of the screen, it will be circularly polarized and stopped by the plane polarizing layer 17. Thus, the only light reaching the eye of the observer will be from the projector and all the reflection of extraneous light will be substantially eliminated.

Referring back to Figs. 2 and 4, the photosensitive sheet 35 comprises the same support 11 and rear surface 12 as the finished screen; also the birefringent layer 16 is already in place on the sensitive sheet 35. The various methods of manufacture obviously involve making a plane polarizer 17 with non polarized spots 22 properly registered. One preferred method of doing this is to have a polarizing layer 36 whose polarizing power is destroyed when exposed to intense light. Light from the source 23 is uniformly distributed as it first passes through the layer 36 and has little effect on the polarizing bodies. After it is focused by the concave elements in the reflector 21, it forms very intense spots at the proper points in the layer 36 thus depolarizing these spots. Although the light source 23 is shown as a lamp, I prefer to use radiation of wavelength different from the visible light used in ordinary projection which radiation is particularly effective in destroying the polarizing properties of sheet polarizers. Of course the heating effect of any radiation is quite effective in depolarizing so that the wavelength of the exposing light is not too critical.

Since the exposing light must be very intense to heat up the screen faster than the heat normally dissipates, subsequent exposure to an ordinary projected image does not cause further objectionable deterioration of the screen. Also when the screen is properly used, the focused light which is the most intense part passes only through the depolarized spots and doesn't strike the remainder of the polarizing surface.

Alternatively, the sensitive layer 36 consists of a raw vectograph film of the known type which becomes a plane polarizer when treated with suitable inks. This film is overcoated with a photosensitive resist which after exposure is washed off all except the highly exposed spots leaving the vectograph film open to the air in these areas. Direct immersion in the standard iodizing vectograph solutions produces the required polarizer with unpolarized spots still covered by resist. These spots of resist may be later removed if desired but this is not absolutely necessary.

Whatever method is used for producing the polarizing sheet with unpolarized or depolarized spots the resulting screen 10 has the properties described in connection with Figs. 1 and 5 to 9.

What I claim and desire to secure by Letters Patent of the United States is:

1. A screen for displaying optical images projected thereonto by a projector in front of the screen comprising a transparent support having opposite sides, a light reflecting surface at the rear of said support and having elements for focusing reflected light at the front of said support, and a light polarizing means at the front side of said support and having non-polarizing areas at the foci of said elements, the polarizing areas of said means twice intercepting and substantially cutting off extraneous light but at most only once intercepting the light from the projector which is reflected by said elements through said non-polarizing areas.

2. A screen for displaying optical images projected thereonto by a projector in front of the screen comprising a light reflecting surface, and circular polarizing means, having non-polarizing spots, immediately in front of and facing away from said surface and positioned to intercept once only light from the projector and to intercept twice, in opposed directions relative to the polarizing means and thereby substantially cutting off, other light incident on the screen from the front.

3. A screen for displaying optical images projected thereonto by a projector in front of the screen comprising a light reflecting surface, and circular polarizing means, having non-polarizing spots, immediately in front of and facing away from said surface and positioned to intercept once only light from the projector and to intercept twice, in opposed directions relative to the polarizing means and thereby substantially cutting off, other light incident on the screen from the front, and means on said reflecting surface for focusing on said non-polarizing spots only the light from the projector.

4. A screen for displaying optical images projected thereonto by a projector axially positioned in front of the screen comprising a light reflecting surface with a plurality of juxtaposed elements concave to the front of said surface, and a circular polarizing sheet substantially in the focal plane of said elements and facing away from said surface, said circular polarizing sheet having a non circularly-polarizing spot in front of each element, said spot including the point at which light from the projector is focused by the corresponding element.

5. A screen for displaying optical images projected thereonto by a projector axially positioned in front of the screen comprising a transparent support with a plurality of lenticules on the rear surface of said support and concave to the front of said support, and a circular polarizing sheet on the front surface of said support substantially in the focal plane of said lenticules and facing away from said support, said circular polarizing sheet having a non circularly-polarizing spot in front of each lenticule, said spot including the point at which light from the projector is focused by the corresponding lenticule.

6. A screen for displaying optical images projected thereonto by a projector axially positioned in front of the screen comprising a transparent support with a plurality of lenticules on the rear surface of said support and concave to the front of said support, and a circular polarizing sheet on the front surface of said support substantially in the focal plane of said lenticules and facing away from said support, said circular polarizing sheet, including a quarter-wave retardation layer on the back of a plane polarizing layer, having a non-polarizing spot in front of each lenticule in the plane polarizing layer, said spot including the point at which light from the projector is focused by the corresponding lenticule.

7. A screen for displaying optical images projected thereonto by a projector axially positioned in front of the screen comprising a transparent support with a plurality of lenticules on the rear surface of said support and concave to the front of said support, a reflector coating over the lenticular surface, and a circular polarizing sheet on the front surface of said support substantially in the focal plane of said lenticules and facing away from said support, said circular polarizing sheet having a non circularly-polarizing spot in front of each lenticule, said spot including the point at which light from the projector is focused by the corresponding lenticule.

8. A projector screen comprising a light transmitting support having opposite surfaces and a plurality of lenticular elements in the rear surface of said support, and a circular polarizing sheet on the front surface of said support for transmitting substantially all the light incident thereupon from the front and for permitting the return after reflection at the rear surface of only the light coming from a point on the axis of the screen.

9. A projector screen comprising a light transmitting support having opposite surfaces and a plurality of lenticular elements in the rear surface of said support, a reflector coating on said lenticular surface, and a circular polarizing sheet, including a quarter-wave retardation layer on the back of a plane polarizing layer, on the front surface of said support for transmitting substantially all the light incident thereupon from the front and for permitting the return after reflection by said reflector coating of only the light coming from a point on the axis of the screen.

10. A projector screen comprising a light transmitting support having opposite surfaces and a plurality of lenticular elements in the rear surface of said support, a reflector coating on said lenticular surface, a circular polarizing sheet on the front surface of said support for transmitting substantially all the light incident thereupon from the front and substantially in the focal plane of said lenticular and non circularly-polarizing spots in said circular polarizing sheet for permitting the return after reflection by said reflector coating of only the light coming from a point on the axis of the screen.

11. A projection screen comprising a light transmitting support having opposite surfaces and a plurality of lenticular elements in the rear surface of said support, a metallic coating on said lenticular surface, a circular polarizing sheet on the front surface of said support for transmitting substantially all the light incident thereupon, said circular polarizing sheet including a quarter-wave retardation layer on the back of a plane polarizing layer which lies substantially in the focal plane of said lenticular elements, and non circular-polarizing spots in said plane polarizing layer at the foci of said lenticular elements for permitting the return after reflection by said metallic coating of only the light coming from a point on the axis of the screen.

12. A projection screen comprising a light transmitting support having opposite surfaces and a plurality of lenticular elements in the rear surface of said support, a metallic coating on said lenticular surface, a circular polarizing sheet on the front surface of said support for transmitting substantially all the light incident thereupon, said circular polarizing sheet including a quarter-wave retardation layer on the back of a plane polarizing layer which lies substantially in the focal plane of said lenticular elements, and non circularly-polarizing spots in said plane polarizing layer at the foci of said lenticular elements for permitting the return after reflection by said metallic coating of only the light coming from a point on the axis of the screen, said non circularly-polarizing spots being progressively and radially displaced with respect to the optic axis of said lenticular elements from the paraxial region to the edges of the screen.

13. The method of producing a screen for displaying optical images which comprises applying a metallic coating to a lenticulated rear surface of a transparent support, placing a quarter-wave retardation layer adjacent the plane front surface of said support, placing a plane polarizing layer adjacent said quarter-wave retardation layer, and depolarizing said polarizing layer at the foci of the lenticular elements.

14. The method of producing a screen for displaying optical images which comprises applying a metallic coating to a lenticulated rear surface of a transparent support, placing a quarter-wave retardation layer adjacent the plane front surface of said support, placing a plane polarizing layer adjacent said quarter-wave retardation layer, and exposing said screen to an intense light source occupying the same relative position with respect to the screen as a projector whereby the light focused on said polarizing material by the lenticulated surface will form a plurality of non-circularly polarizing spots at the foci of the lenticular elements.

15. The method of producing a screen for displaying optical images which comprises applying a metallic coating to a lenticulated rear surface of a transparent support, placing a quarter-wave retardation layer adjacent the plane front surface of said support, placing a vectosensitive layer having a photosensitive resist overcoating adjacent said quarter wave retardation layer, exposing the photosensitive resist by a light at the position to be occupied by a projector, removing the resist except where highly exposed by light reflected and focused by the lenticular rear surface, and processing the uncovered areas of the vectosensitive layer to a plane polarizer having non-polarized spots at the exit pupils of the lenticular elements.

STEPHEN M. MACNEILLE.